Sept. 13, 1927.  J. A. ANDERSON  1,642,476
AUTOMATIC TAKE-UP BEARING
Filed Nov. 26, 1926
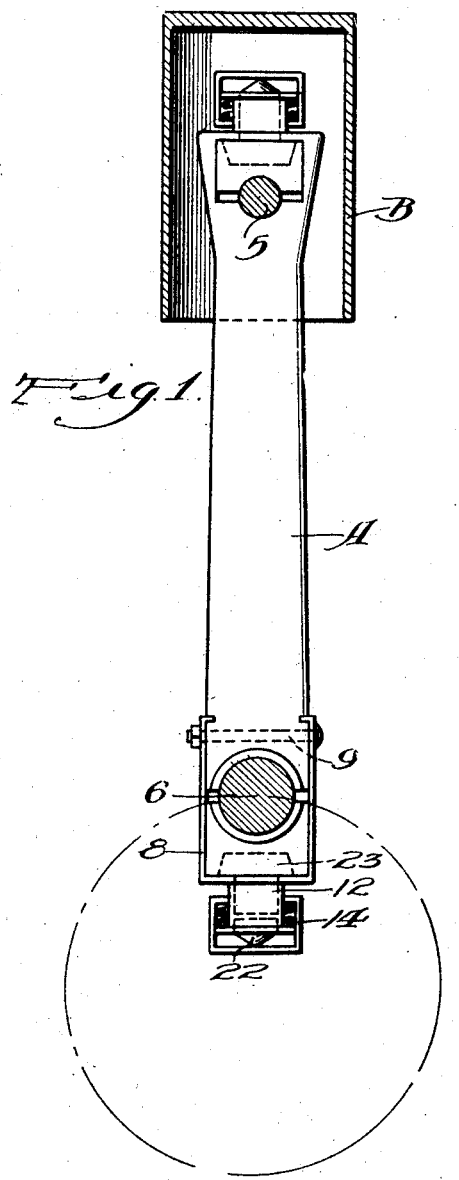
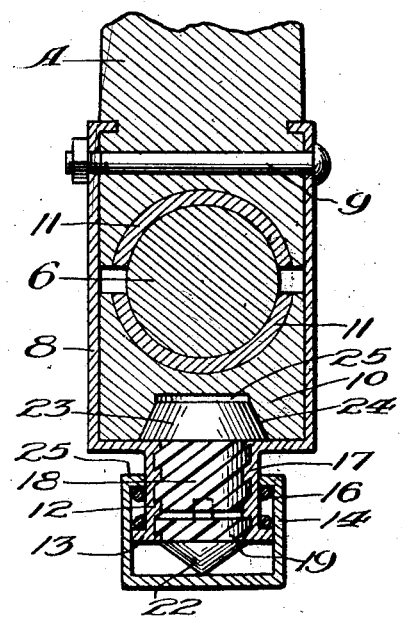
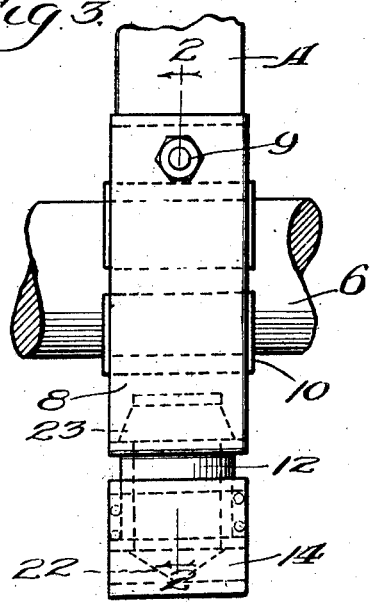
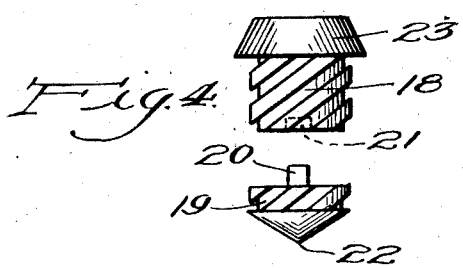
Inventor
John A. Anderson Patented Sept. 13, 1927.

1,642,476

UNITED STATES PATENT OFFICE.

JOHN A. ANDERSON, OF GENESEO, ILLINOIS, ASSIGNOR TO BARTLETT S. GRAY, TRUSTEE, OF GENESEO, ILLINOIS.

AUTOMATIC TAKE-UP BEARING.

Application filed November 26, 1926. Serial No. 150,883.

This invention relates to a bearing having a member which is adjustable toward a rotating part journaled in the bearing, and is concerned more particularly with means associated with said adjustable member for advancing the same automatically as wear occurs upon the surfaces under friction. It may be employed advantageously for many purposes and particularly so in connection with a split bearing such as is commonly used in the connecting rod of many kinds of engines. In the description to follow reference will be made to the present bolt in relation to a conventional connecting rod, although, as above suggested, it may be applied to other uses as well.

It is an object of my invention to provide simple and effective means which will act automatically to take up bearing wear occasioned through usage, thereby preventing development of play or lost motion. The means devised for this purpose includes a bolt having an associated spring for imparting rotation thereto, whereby a movable bearing part is advanced whenever permitted to do so by the development of wear or play. The parts for this purpose are also so combined and associated as to utilize forces of momentum which are generated in a connecting rod bearing as the crank pin is revolved through its movement cycle or a wrist pin is stroked back and forth. According to this invention an advance of the adjustable bearing member to a new position will be maintained against reactive forces of momentum occurring during each movement cycle of the rod. Furthermore, the parts which act to advance such an adjustable bearing member are themselves held against play, so that pressure once placed upon the bearing member will remain thereafter constant and non-variable.

It is with objects such as these that the present improvements are concerned. Other advantages are also derived from the invention as will be pointed out hereinafter in the specification and claims. An embodiment of my invention is set forth in the accompanying drawing in the manner following:

Figure 1 shows an elevation of a connecting rod in operative relation to a piston and crank pin, these latter parts being shown in section;

Fig. 2 is an enlarged detail in section taken on line 2—2 of Fig. 3;

Fig. 3 is a side elevation of the parts shown in Fig. 2; and

Fig. 4 is a detail in elevation of the take-up bolt mechanism per se.

As illustrative of one use to which my take-up device may be applied, I have shown in the drawing a connecting rod A formed with a bearing at one end for the wrist pin 5 of a piston B, and at its other end with a bearing for a crank pin 6 which is movable through a circular path as delineated by the line 7. The bearings at the two ends of the connecting rod may be generally similar so that a description of but one—the lower one—will be given in detail.

Referring particularly to Figs. 2 and 3, the lower end of the connecting rod carries a strap 8 which may be secured in place as by means of bolts 9. Mounted within the strap is a movable bearing member 10 which, in co-operation with the proximate end of the conecting rod, furnishes seats for babbitts 11 between which is journaled a crank pin 6.

From the end of the strap 8 is extended a cylindrical shell 12 having at its extremity an outturned flange 13. Co-operating with this shell is a cap 14 which has an inwardly extending flange 15. I surround the shell with a coiled spring 16 which exerts opposing pressures on the two flanges 13 and 15 whereby the cap is urged toward the connecting rod.

Formed interiorly of the shell are threads 17 having a rather steep pitch, of perhaps 22½ degrees, for co-operation with similarly formed threads on a bolt 18 which may be advanced rotatably within the shell. Associated with the bolt is a separable end member 19 also threaded for rotatable advancement within the shell and provided with a key 20 adapted to enter a slot 21 in the bolt end so as to transmit rotary motion thereto. The outer extremity of the end member is cone-shaped so as to bear at a single point 22 against the end of the cap 14. The remote end of the bolt 18 is provided with an inverted cone head 23 which fits within a correspondingly shaped socket 24 in the bearing member 10. The walls of this socket at its small end are preferably straightened out as at 25 for a purpose which will presently appear.

With an automatic take-up device of the kind described, the spring 16 exerts upon the end member 19 a constant pressure which tends to advance the bolt rotatably, thereby shifting the bearing member 10 as needed to take up wear. The cone head on the bolt coacts with the socket 24 after the manner of a friction clutch so as to resist any opposing force proceeding from the bearing member which might have the effect of causing the bolt to retract from an advanced position. Should the walls of the socket 24 wear away after long and continued use of the device, the bolt head can enter further into the cylindrical end 25 of the socket, its friction therewithin remaining unimpaired because of this special provision.

The construction just described is followed in the main at the wrist pin end of the connecting rod. It is possible, however, to dispense with the strap 8 and in lieu thereof provide in the body of the rod a suitable opening in which may be received the movable bearing member. In other respects the construction is substantially the same. If the present take-up bolts be used in any such manner as has been suggested, forces of momentum will develop with each reciprocation of the connecting rod such as tend to move the bolts in one direction or the other. It is desired that each bolt be assisted in its forward movement, and this I have provided for in the spring 16. It is equally desirable that reverse movement of the bolts be opposed, and for this reason I make use of the friction between the cone heads and the sockets in which they are seated. By the means described the bolts are assured of a one-way movement, so that pressure once exerted upon the movable bearing member will not relax.

The entire assembly of parts forming the present take-up mechanism is simple and inexpensive and experience has proven its value in service. I desire, therefore, that protection should be accorded as defined by the claims following in which are set forth the essentials or principles of this invention.

I claim:

1. In a bearing, an adjustable member movable toward a rotating part which is journaled within the bearing, a bolt having a head in frictional engagement with said member and extended away from the rotating part, means surrounding the bolt having a stationary mounting on the bearing, interengaging threads on said means and bolt so pitched as to cause the bolt to be rotatively advanced in response to pressure directed endwise thereupon, an end member associated with the bolt having similar threads also co-operating with said means, and spring means exerting upon said end member a constant tension in the direction of said rotating part such that the bolt tends to advance in that direction to transmit a like movement to the adjustable bearing member, substantially as described.

2. In a bearing, an adjustable member movable toward a rotating part which is journaled within the bearing, a guideway for the adjustable member, a shell carried by the guideway, a bolt within the shell having a cone head in frictional engagement with the adjustable member, a cap surrounding the shell, a spring tending to draw the cap toward the guideway, an end member associated with the bolt receiving pressure from the cap and having a mounting within the shell, and interengaging screw threads on the shell, bolt, and end member having a pitch sufficiently steep to cause the end member and bolt to be rotatively advanced in response to spring pressure upon the end member, substantially as described.

3. A bearing having two members, one fixed and the other adjustable, a screw threaded bolt bearing against the adjustable member, a screw threaded mounting for the bolt stationary with relation to the fixed bearing, the interengaging threads of the bolt and mounting being of such a pitch as to induce travel of the bolt therein in response to pressure exerted endwise upon the bolt, and tension means associated with the bolt and transmitting thereto an endwise force such that the bolt tends to move and thereby advance the adjustable member, substantially as described.

4. A bearing having two members, one fixed and the other adjustable, a screw threaded bolt bearing frictionally against the adjustable member, a screw threaded mounting for the bolt stationary with relation to the fixed bearing, the interengaging threads of the bolt and mounting being of such a pitch as to induce travel of the bolt therein in response to pressure exerted endwise upon the bolt, and tension means associated with the bolt and transmitting thereto an endwise force such that the bolt tends to move and thereby advance the adjustable member, the friction of the bolt with the adjustable member being such as to resist reactive movement of the former, substantially as described.

5. A bearing having two members, one fixed and the other adjustable, a screw threaded bolt bearing against the adjustable member, a screw threaded mounting for the bolt stationary with relation to the fixed bearing, the interengaging threads of the bolt and mounting being of such a pitch as to induce travel of the bolt therein in response to pressure exerted endwise upon the bolt, a pointed end member also screw threaded for co-operation with the mounting and for exerting an end pressure upon the bolt, and tension means bearing upon the point of said end member whereby to exert a pressure thereupon which is transmissible to the bolt to cause advancement thereof whereby the position of the adjustable bearing member may be altered, substantially as described.

6. A bearing having two members, one fixed and the other adjustable, screw means bearing against the adjustable member, a mounting for the screw means stationary with relation to the fixed bearing, the interengaging threads of the screw means and mounting being of such a pitch as to induce travel of the screw means in response to pressure exerted endwise thereupon, and tension means associated with the screw means for applying an end pressure thereto, substantially as described.

JOHN A. ANDERSON.